(No Model.) 2 Sheets—Sheet 2.
T. G. LEWIS & F. M. BAILEY.
BRAZING APPARATUS.
No. 591,982. Patented Oct. 19, 1897.
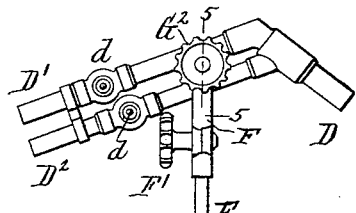
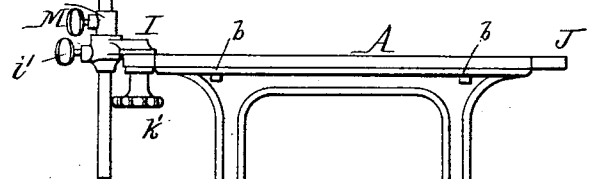
Fig. 3.
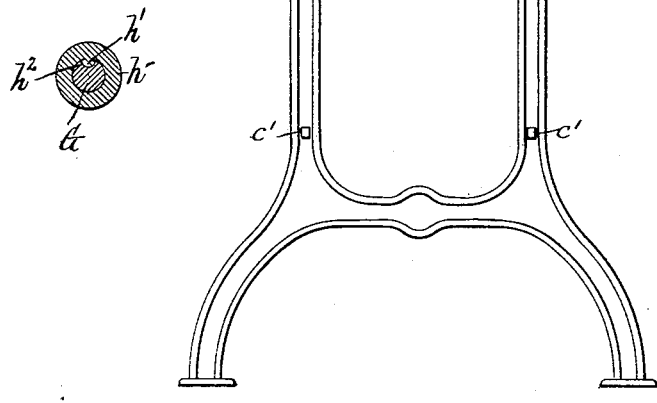
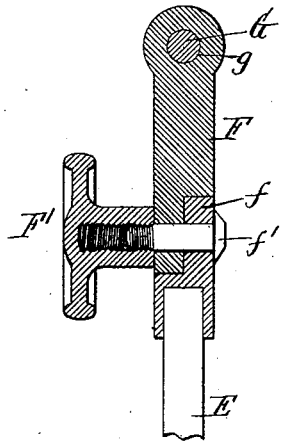
Fig. 4.
Fig. 6.
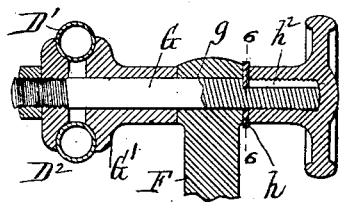
Fig. 5.
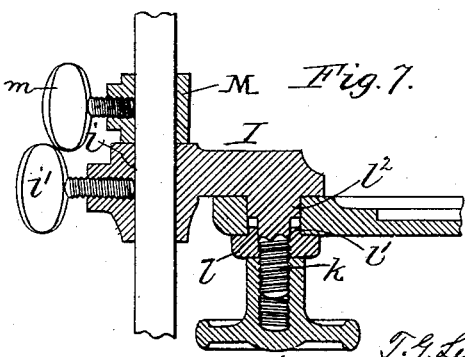
Fig. 7.
Witnesses:
F. Gustav Wilhelm.
Henry L. Deck.
T. G. Lewis
F. M. Bailey
Inventors
By Wilhelm & Bonner
Attorneys.
THE NORRIS PETERS CO., PHOTO-LITHO., WASHINGTON, D. C.

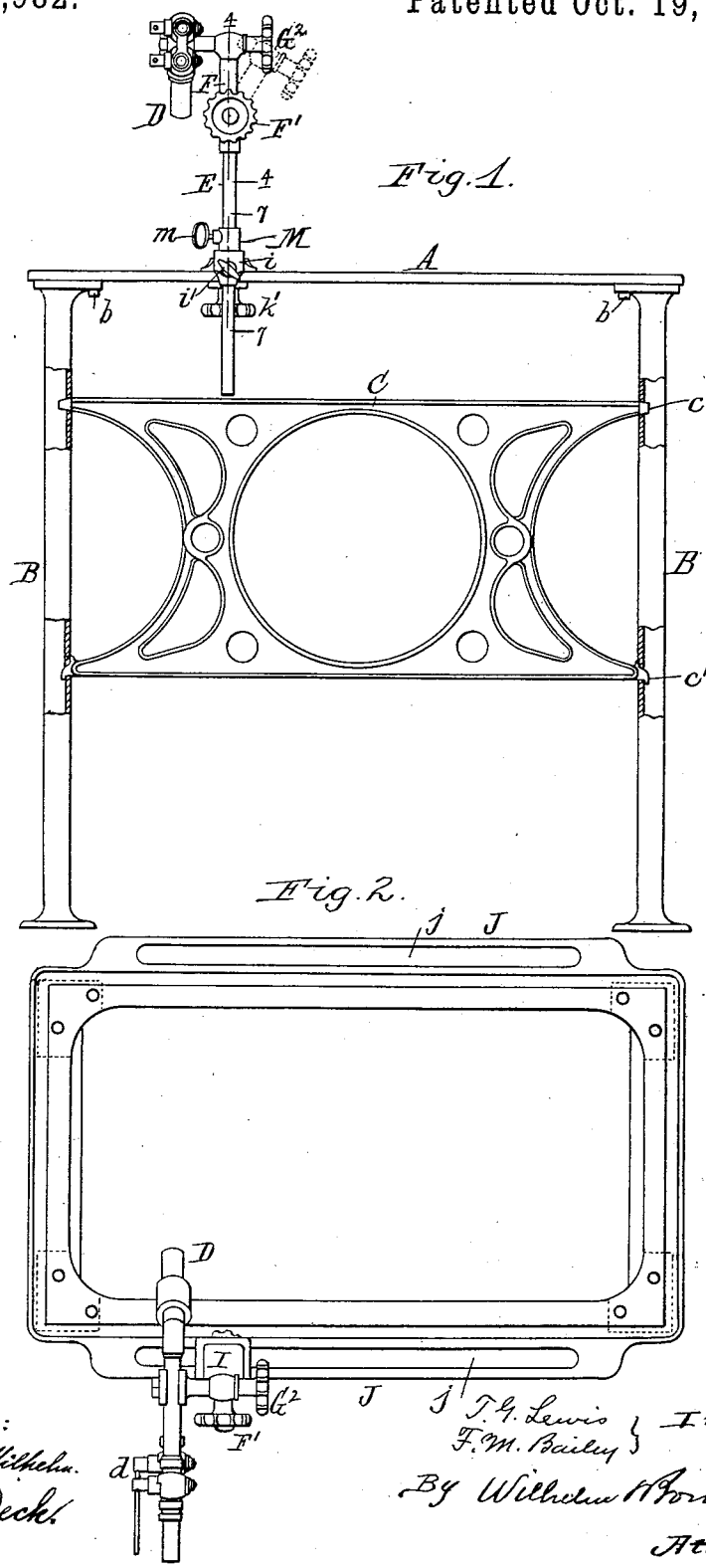

UNITED STATES PATENT OFFICE.

THEODORE G. LEWIS AND FREDERICK M. BAILEY, OF BUFFALO, NEW YORK, ASSIGNORS TO THE BUFFALO DENTAL MANUFACTURING COMPANY, OF SAME PLACE.

BRAZING APPARATUS.

SPECIFICATION forming part of Letters Patent No. 591,982, dated October 19, 1897.

Application filed March 1, 1897. Serial No. 625,513. (No model.)

*To all whom it may concern:*

Be it known that we, THEODORE G. LEWIS and FREDERICK M. BAILEY, citizens of the United States, residing at Buffalo, in the county of Erie and State of New York, have invented a new and useful Improvement in Brazing Apparatus, of which the following is a specification.

This invention relates to the brazing stands or appliances which are used more particularly by bicycle manufacturers and which consist, essentially, of a table, one or more blowpipes adjustably supported on the table and an air-reservoir and supply-pipes for delivering air and gas to the blowpipes.

One of the objects of our invention is to render the blowpipes capable of adjustment to any desired angle and elevation, and also to apply the pipes to the table in such manner that either or both of the same can be readily shifted to any desired position on the table, thus adapting the apparatus to a large variety of work.

A further object of the invention is to simplify the construction of the frame of the brazing-stand.

In the accompanying drawings, consisting of two sheets, Figure 1 is a side elevation, partly in section, of our improved brazing apparatus, the air-reservoir and supply-pipes being omitted. Fig. 2 is a top plan view thereof. Fig. 3 is an end view of the apparatus. Fig. 4 is a vertical section on an enlarged scale in line 4 4 of Fig. 1. Fig. 5 is a similar section in line 5 5, Fig. 3, on an enlarged scale. Fig. 6 is a cross-section in line 6 6, Fig. 5. Fig. 7 is an enlarged transverse vertical section in line 7 7, Fig. 1.

Like letters of reference refer to like parts in the several figures.

A is the rectangular bed or top plate of the brazing-stand, provided with the usual facing of firebrick, which is not shown in the drawings.

B represents the upright end frames, which support the top plate and which are secured to the latter by vertical screws or bolts $b$, passing through the end bars of the top-plate and the upper portions of the end frames.

C represent side frames connecting the end frames and provided at their upper portions with tenons $c$, which enter openings in the end frames, as shown in Fig. 1, and at their lower portions with hooks or depending lips $c'$, which engage in similar openings of the end frames. The tenons $c$ prevent lateral displacement of the upper portions of the side frames, while the hooks $c'$ prevent spreading of the lower portions of the end frames. By this construction, the top plate, the end frames, and the side frames are rigidly connected and the end and side frames are interlocked without the use of bolts, screws, or other separate fastenings. In connecting these parts, the hooks $c'$ of the side frame are first engaged with the lower openings of the end frames by tilting the latter outward. The end frames are then returned to their upright position, so that the tenons $c$ of the side frames enter the upper openings of the end frames and the top plate is then secured to the end frames by the screws $b$.

In the drawings but a single blowpipe is shown, but two of such pipes are generally used in practice. Each of these blowpipes consists of the usual nozzle D and air and gas supply pipes $D'$ $D^2$, connected with the nozzle and provided with the customary regulating valves $d$.

E is a vertical supporting rod or standard for the blowpipe carrying at its upper end an adjustable arm F, which is jointed to a rigid lug $f$ at the upper end of the standard by a transverse bolt $f'$, as shown in Figs. 3 and 4, so that said arm can be inclined in either direction lengthwise of the brazing-stand, as shown by dotted lines in Fig. 1. This arm is clamped in position after adjustment by a hand wheel or nut F', applied to the projecting end of the bolt $f'$ and bearing against the side of the arm, the pivot-opening in the arm and the lug $f$ of the standard being smooth, as shown in Fig. 4, to permit the parts of the joint to be clamped by tightening the hand-wheel.

The blowpipe is supported at the upper end of the adjustable arm F by a horizontal bolt, rod, or head G, Fig. 5, which is preferably capable of rotary adjustment in a socket $g$ at the upper end of the arm F, so that the nozzle of the blowpipe can be tilted up or down at any desired angle. The rod G carries at one end a clamp G' of any suitable construction which embraces the blowpipe, and at its opposite end it is provided with a clamping-nut or hand-wheel G², which engages with the adjacent screw-threaded end of the rod. In order to reliably clamp this rod in its socket, a washer $h$ is interposed between the hub of the hand-wheel G² and the opposing end of the socket $g$, as shown in Fig. 5, and this washer is provided in its opening with a radial feather or spline $h'$, which extends into a longitudinal groove $h^2$, formed in the projecting end of the rod G, as shown in Figs. 5 and 6, so as to allow the washer to slide lengthwise on the rod but hold it against turning thereon. By this construction, after tightening the hand-wheel G², the blowpipe can be tilted on the adjustable arm F by seizing the blowpipe and without loosening the hand-wheel, the washer $h$ receiving the friction caused by turning the rod G and thus preventing the hand-wheel from becoming unscrewed, which would be liable to occur if the hub of the hand-wheel were made to bear directly against the socket $g$.

By providing the blowpipe support or standard with a joint arranged transversely of the table, in addition to the usual joint arranged lengthwise of the table, the blowpipe-nozzle can be tilted laterally or toward either end of the table as well as up and down, rendering it universally adjustable and adapting it to a great variety of work.

The standard E is preferably made vertically adjustable in a bracket I, projecting from the side of the top plate, the bracket having a vertical socket $i$, in which the standard is adjustably secured by a set-screw $i'$, as shown in Figs. 1, 3, and 7. The bracket I is preferably made adjustable lengthwise of the table, so that the blowpipes can be shifted toward either end thereof. For this purpose the top plate is provided at its sides with horizontal wings or extensions J, in which are formed longitudinal slots $j$, as shown in Fig. 2, and each of the brackets is provided with a vertical screw-bolt $k$, passing through the adjacent slot of the top plate and having on the under side of the plate a clamping-nut or hand-wheel $k'$, as shown in Fig. 7. A block or washer $l$ is preferably interposed between the hub of this hand-wheel and the under side of the top plate and this block and the bracket are provided on their opposing sides with tenons $l'$ $l^2$, respectively, which enter the slot of the top plate, so as to prevent the bracket from turning or twisting out of position. Upon loosening the hand-wheel $k'$ the bracket with the standard and blowpipe carried by the same can be shifted lengthwise of the table, enabling work to be brazed at either end of the table as well as in the middle of the same, as may be most convenient. This construction also permits both blowpipes to be placed on one side of the table, if desired.

In order to permit the blowpipe to be rotated and at the same time held at the desired elevation, the standard of each pipe is provided with a vertically-adjustable collar M, adapted to rest loosely upon the bracket I and having a set-screw $m$. In the use of this feature the lower set-screw $i'$ of the standard is loosened, and after adjusting the standard to the proper height the set-screw of the collar M is tightened, whereby the collar supports the standard.

We claim as our invention—

1. In a brazing apparatus, the combination with a table or support, of a standard provided at its upper end with a socket, a screw-bolt or pivot carrying a blowpipe and arranged in said socket and provided with a longitudinal groove, a clamping-nut applied to the projecting end of said bolt, and a washer interposed between said socket and said screw-nut and having a radial feather or spline engaging in the groove of the screw-bolt, substantially as set forth.

2. In a brazing apparatus the combination with a table having its bed or top plate provided at one side with a horizontal slot, of an adjustable bracket having a shank or bolt passing through said slot and provided with means for clamping the same in the slot, and a blowpipe-standard carried by said adjustable bracket, substantially as set forth.

3. In a brazing apparatus, the combination with a table having its top plate provided with a horizontal slot, of an adjustable bracket having a screw-bolt passing through said slot and a tenon projecting into the slot, a clamping-nut applied to the projecting end of said screw-bolt, a block interposed between said nut and the top plate and having a tenon projecting into the slot of the plate, and a blowpipe-standard carried by said bracket, substantially as set forth.

Witness our hands this 24th day of February, 1897.

THEODORE G. LEWIS.
FRED. M. BAILEY.

Witnesses:
CARL F. GEYER,
JNO. J. BONNER.